United States Patent
De Marchi

(10) Patent No.: US 7,175,352 B2
(45) Date of Patent: Feb. 13, 2007

(54) CONNECTOR-PLUG PART FOR AN OPTICAL PLUG-IN CONNECTION

(75) Inventor: Silverio De Marchi, Ascona (CH)

(73) Assignee: Diamond SA, Losone (CH)

( * ) Notice: Subject to any disclaimer, the term of this patent is extended or adjusted under 35 U.S.C. 154(b) by 0 days.

(21) Appl. No.: 10/518,397

(22) PCT Filed: May 30, 2003

(86) PCT No.: PCT/CH03/00339

§ 371 (c)(1),
(2), (4) Date: Dec. 17, 2004

(87) PCT Pub. No.: WO04/001472

PCT Pub. Date: Dec. 31, 2003

(65) Prior Publication Data

US 2005/0175291 A1   Aug. 11, 2005

(30) Foreign Application Priority Data

Jun. 24, 2002   (CH) ..................................... 1084/02
Aug. 2, 2002    (CH) ..................................... 1349/02

(51) Int. Cl.
   *G02B 6/38* (2006.01)
   *G02B 6/255* (2006.01)
(52) U.S. Cl. .......................................... 385/53; 385/60
(58) Field of Classification Search .................... 385/99
   See application file for complete search history.

(56) References Cited

U.S. PATENT DOCUMENTS

| | | | |
|---|---|---|---|
| 4,645,295 A | 2/1987 | Pronovost | |
| 4,946,249 A * | 8/1990 | Barlow et al. | 385/97 |
| 5,074,638 A | 12/1991 | Poli et al. | |
| 5,367,594 A * | 11/1994 | Essert et al. | 385/70 |
| 5,546,491 A * | 8/1996 | Loch | 385/99 |
| 5,717,813 A * | 2/1998 | Harman et al. | 385/147 |
| 5,894,536 A * | 4/1999 | Rifkin et al. | 385/99 |
| 5,993,070 A | 11/1999 | Tamekuni et al. | |
| 6,412,640 B1 * | 7/2002 | Destanque et al. | 206/581 |
| 6,443,633 B1 * | 9/2002 | Liberty et al. | 385/99 |
| 6,672,774 B2 | 1/2004 | Theuerkorn et al. | |

FOREIGN PATENT DOCUMENTS

| | | |
|---|---|---|
| EP | 0 421 305 A1 | 4/1991 |
| EP | 0 864 888 A1 | 9/1998 |
| WO | 96/31795 A1 | 10/1996 |

\* cited by examiner

*Primary Examiner*—Sung Pak
(74) *Attorney, Agent, or Firm*—Nath & Associates, PLLC; Jerald L. Meyer; Matthew J. Moffa

(57) ABSTRACT

In order to advantageously weld a pre-mounted connector-plug part (1) to an optical waveguide cable, the connector-plug part is provided with a pin holder (4) receiving a connector-plug pin (2) on a pin receiving section (5). Preferably, two cladding parts (8, 8') form a cable receiving section (6) in said pin holder. In order to carry out welding in a simple manner on the bare end (22) of the end of a fiber, the cladding parts (8, 8') can be pivoted around a hinge (9, 9') between an open position and a closed position. A dividable protective sheath (25, 25') is provided inside the cable receiving section or inside the cladding parts and can enclose the weld. When mounted, the protective sheath can be de-coupled from the cladding parts (8, 8').

15 Claims, 4 Drawing Sheets

CONNECTOR-PLUG PART FOR AN OPTICAL PLUG-IN CONNECTION

Figure 1:
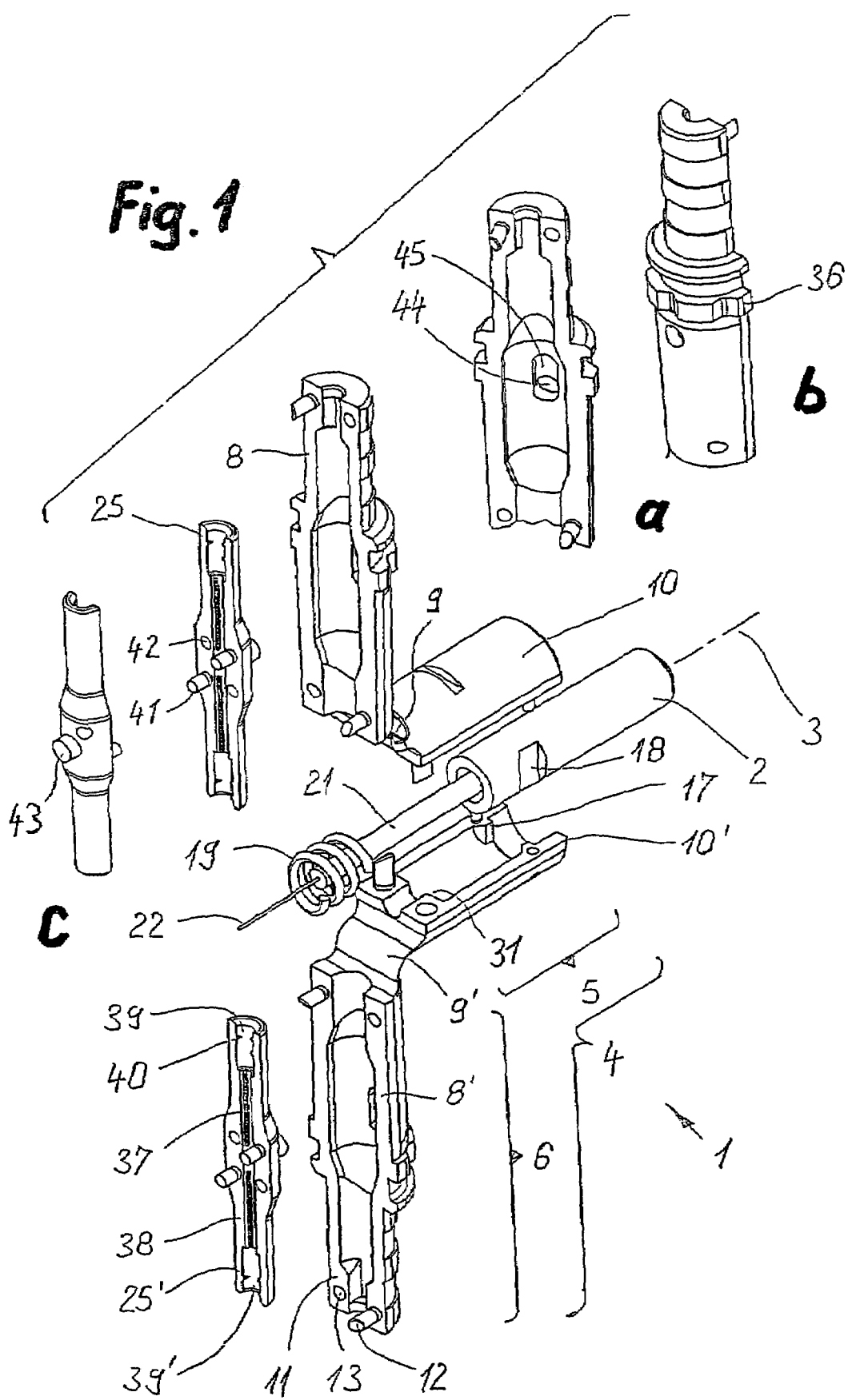

This application is a National Stage of PCT/CH 03/00339, filed May 30, 2003.

The invention relates to a connector-plug part for an optical plug-in connection according to the precharacterizing clause of claim 1. Such connector-plug parts are pre-assembled at the factory, the connection to the actual optical waveguide cable taking place directly at the connector-plug part by welding under conditions in the field. The pre-assembly is intended to allow the difficult centering and fixing of the optical waveguide in the connector-plug pin to be carried out under more suitable factory conditions.

Connector-plug parts of a comparable generic type have been disclosed for example by WO 96/31795 or by EP 864 888. For attaching the welding electrodes, special openings or clearances are provided. A disadvantage of the known connector-plug parts is that the welded location itself is difficult to access and that observation of the welding operation is also made more difficult. Furthermore, the bare optical waveguide in the direct region of the welded location is only insufficiently protected and safeguarded against tensile forces. It is therefore an object of the invention to provide a connector-plug part of the type stated at the beginning with the aid of which the welding operation at the fiber stub can be carried out as unhindered as possible and with good viewing conditions. It is intended in this case that both the pre-assembly and the final assembly of the connector-plug part can be carried out quickly and without complex auxiliary means. Finally, the welded location is also to be optimally protected against mechanical loading and against soiling after final assembly.

This object is achieved according to the invention by a connector-plug part which has the features in claim 1. The connector-plug pin itself may in this case be pre-assembled independently of its mounting or structure in the pin receiving section. The cladding part, which can be pivoted at the joint, makes it possible in a particularly simple way for the welded location at the fiber stub to be exposed and consequently made accessible. The protective sleeve which can be divided and closed around the welded location ensures optimal protection of the welded location after closing of the cladding part into the closed position.

The pin holder advantageously comprises two shell parts, which can be fitted together along the longitudinal center axis, each shell part having a pivotable cladding part, and the protective sleeve likewise comprising two sleeve shells, each of which can be fastened on the inside of a cladding part. In this way, the sleeve shells of the protective sleeve can also be closed by the closing movement of the two cladding parts, it likewise being possible for the prior fastening on the inside of the cladding parts to take place already at the factory. In certain cases, however, it would also be conceivable to connect the two sleeve shells to each other by a hinge extending in the longitudinal direction. Furthermore, the protective sleeve does not necessarily have to be fastened to the cladding part in advance.

The pivotable cladding parts may altogether form the cable receiving section and be connected to the pin receiving section at the joint. Alternatively, however, it would also be conceivable for the pivotable cladding part to extend only over part of the length of the cable receiving section.

Particular advantages arise in technical production terms if the pin holder comprises two identical shell parts which can be fitted together on a plane running through the longitudinal center axis. In this way, different types of shell parts do not have to be produced, because the pin holder can be assembled from two identical shell parts.

In certain cases it would also be conceivable for at least the cable receiving section to comprise two, preferably identical, shell parts which can be fitted together along the longitudinal center axis, each shell part forming the pivotable cladding part which is connected to the pin receiving section at the joint, and the protective sleeve likewise comprising two sleeve shells, each of which can be fastened on the inside of a cladding part. In such a case, the entire pin holder could be formed in one piece, the connector-plug pin being molded for example into the pin receiving section. The cladding parts are molded in one piece onto the pin receiving section in such a way that they can be closed during the assembly of the cable receiving section.

For the connection of neighboring shell parts, projections and clearances which engage in one another, in particular conical lugs and lug openings, may be provided on their contacting surfaces. Depending on the conicity chosen, the two shell parts may be joined together by slight pressure. Depending on the arrangement of the lugs and lug openings, such a snap connection also permits snapping together in specific sequences.

In order to avoid stresses at the welded location, it is expedient if the protective sleeve is mounted displaceably in the axial direction in the cable receiving section in relation to the latter. In this way, compensation is provided even for movements which are initiated by forces on the connector-plug pin.

Optimal mounting of the welded location on the optical waveguide is obtained if the two sleeve shells of the protective sleeve have on their inside, facing the optical waveguide, a channel which receives the optical waveguide and is provided with an adhesive material. The channel may for example be coated with silicone material, which encloses the optical waveguide.

Alternatively, however, it is also possible for an adhesive which brings about a fixed connection in the closed state to be applied to the optical waveguide already before the closing of the two sleeve shells.

The two sleeve shells of the protective sleeve may also have on their inside, facing the optical waveguide, a receiving section at each of their two ends, which respectively clasps the circumferential surface of an optical waveguide cable and of the optical waveguide stub in a clamping manner. In this way, the protective sleeve acts as a tension relieving means for the bare welded location, in that tensile forces are transmitted from the circumferential surface of the optical waveguide cable to the circumferential surface of the optical waveguide stub.

Further advantages in final assembly can be achieved if the two sleeve shells of the protective sleeve are elastically deformable and if they can be fixed on the inside of the cladding parts in such a way that their insides, facing the optical waveguide, run in a concavely curved manner and that the sleeve shells can be fitted together in the closed position of the cladding parts by pressure from the outside. The concave curvature in the pre-assembled state has the effect that, during the assembly, the abovementioned receiving sections first clasp the circumferential surface of the optical waveguide cable or of the optical waveguide stub, thereby avoiding loading of the welded location.

In a way similar to the cladding parts, the sleeve shells may have on their contacting surfaces interengaging projections and clearances, in particular lugs and lug openings, which are arranged in such a way that they still do not engage in one another in the concave state of the sleeve shells. Consequently, a non-positive connection only takes place during pressing together from the outside.

This function is improved still further by each sleeve shell being fastened by an insertion head in a corresponding opening in the cladding part, the insertion heads being releasable from the openings after the pressing together of the sleeve shells for axial release of the protective sleeve. The fixing at the insertion heads is consequently only temporary and serves for captively fastening the sleeve shells on the cladding parts until final assembly.

After the release of the insertion heads from the openings, the protective sleeve can be displaced in the axial direction. A safeguard against twisting is thereby achieved particularly advantageously by arranging on the inside of the cladding parts a slot which adjoins the opening and extends in the axial direction and in which the insertion heads are displaceable after the axial release of the protective sleeve.

The pin holder and the protective sleeve advantageously consist of plastic material, the joint being a film hinge. However, it would also be quite conceivable to produce the pin holder in particular from metal, while the joint could be a mechanical snap joint.

The connector-plug part according to the invention makes it possible in a particularly simple way to mount the connector-plug pin with limited displaceability in the pin receiving section under axial spring prestressing. As a result, not only final assembly, but also pre-assembly is simplified and relatively simply formed connector-plug pins of a particularly hard material, such as ceramic or hard metal, can be used.

Figure 2:
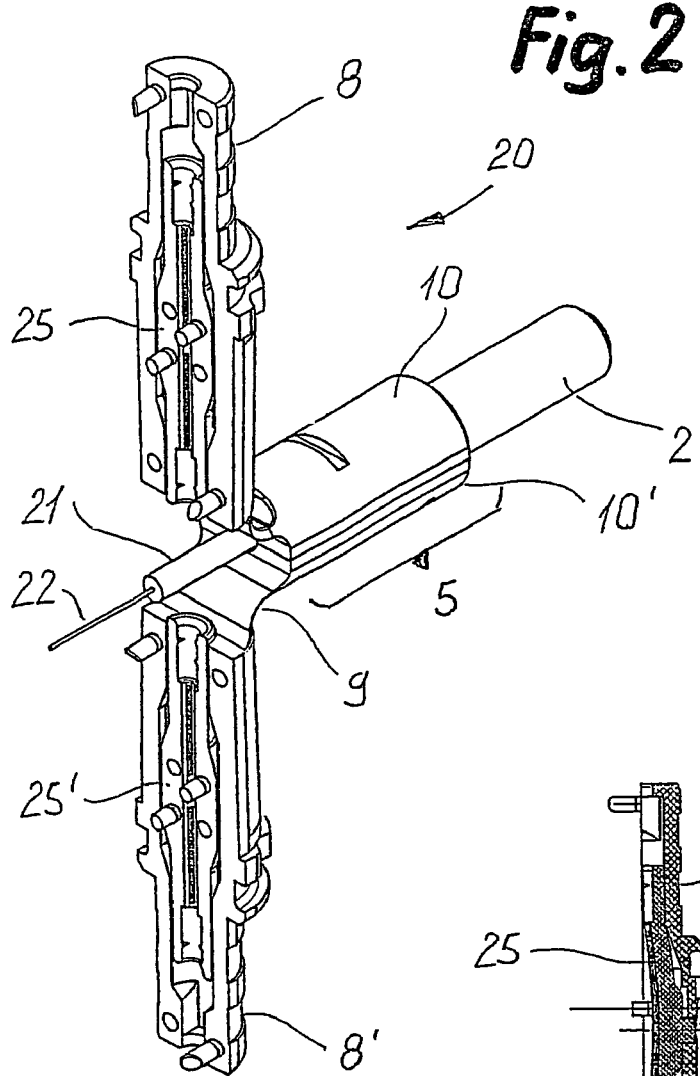
Figure 3:
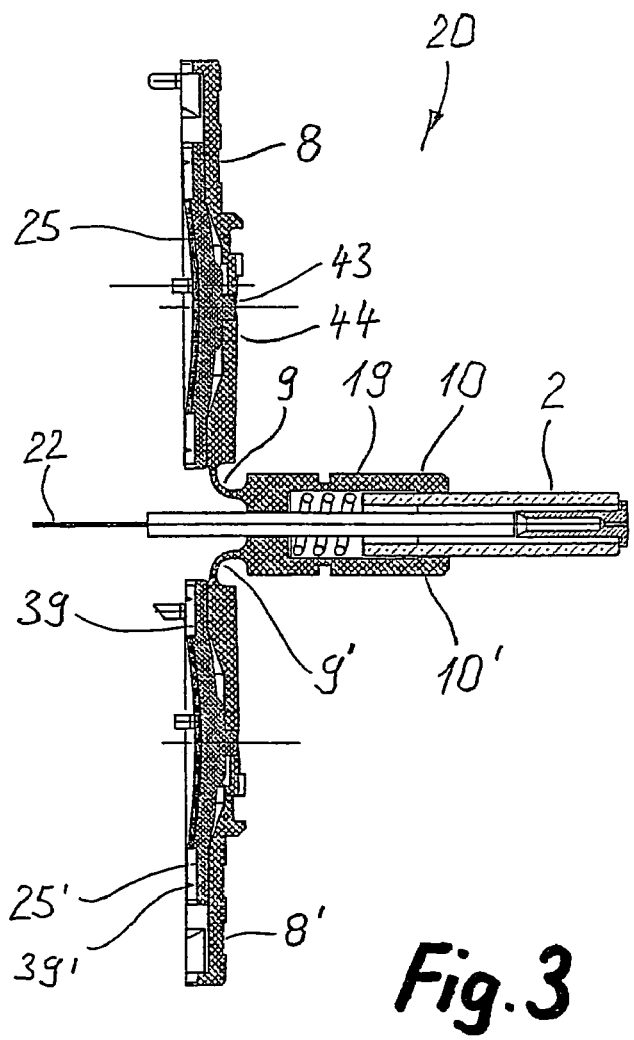
Figure 4:
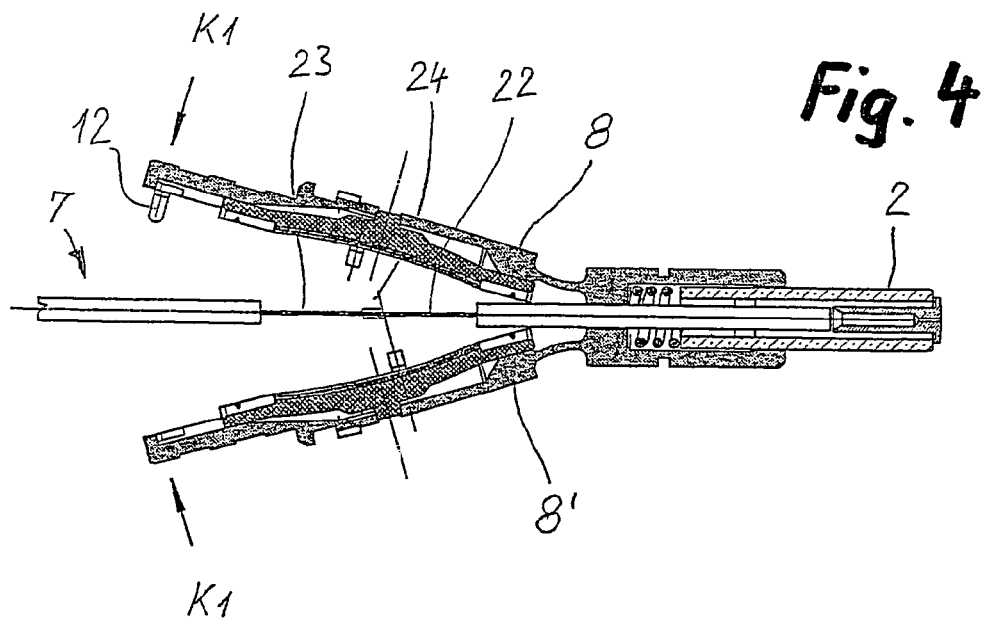
Figure 5:
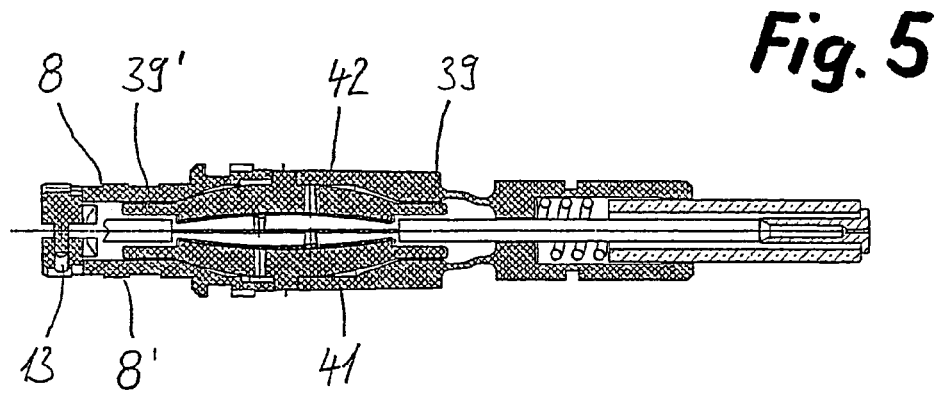
Figure 6:
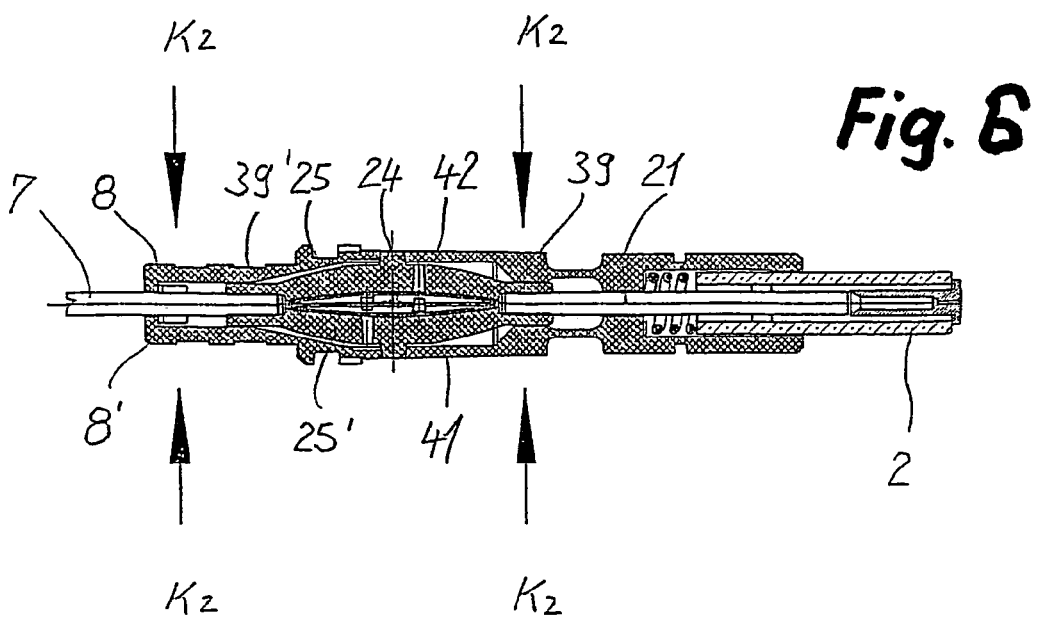
Figure 7:
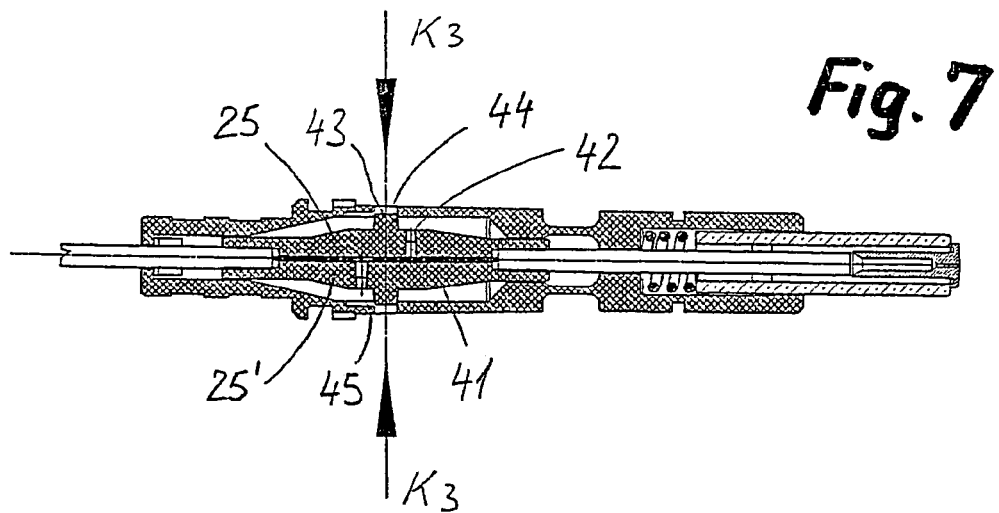
Figure 8:
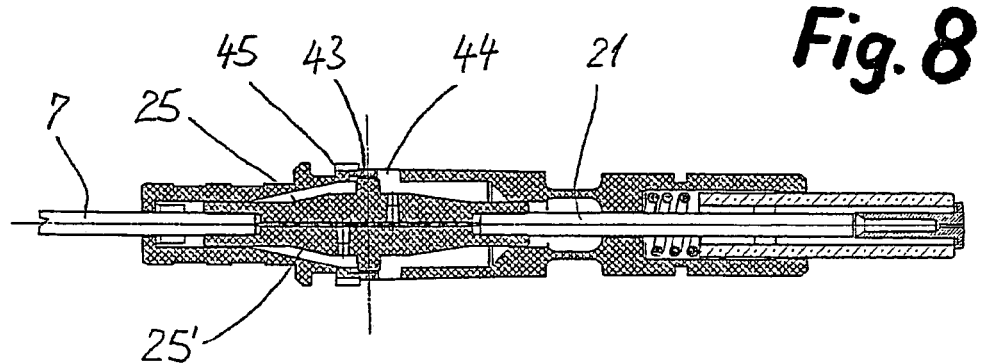
Figure 9:
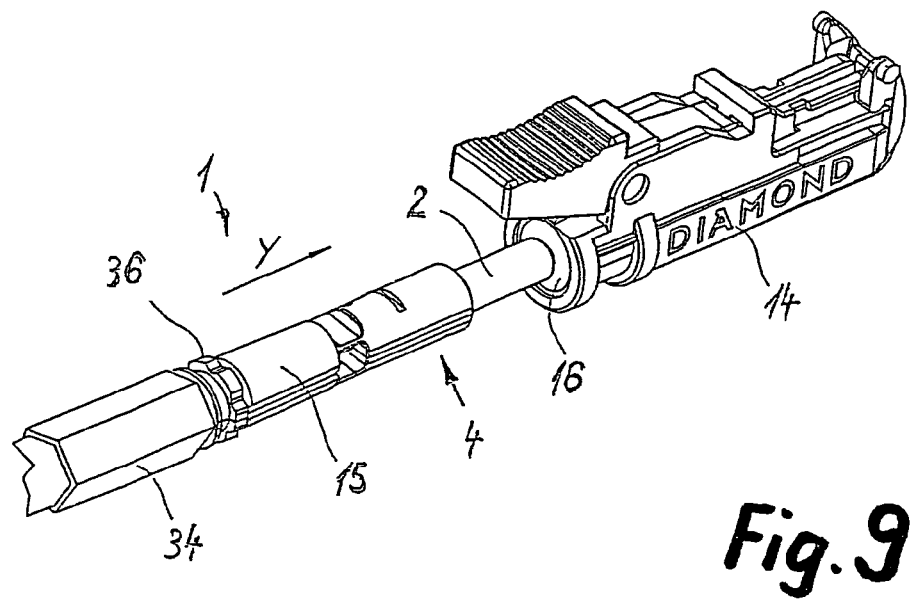

Further individual features and advantages of the invention emerge from the exemplary embodiment described below and from the drawings, in which:

FIG. 1 shows a perspective exploded drawing of a connector-plug part according to the invention, FIG. 2 shows the connector-plug part according to FIG. 1 in the pre-assembled state, FIG. 3 shows a cross section through the pre-assembled connector-plug part according to FIG. 2, FIG. 4 shows a cross section through the connector-plug part according to FIG. 3 after the welding operation and shortly before the closing of the cladding parts, FIG. 5 shows the connector-plug part according to FIG. 4 shortly before the final closing of the cladding parts, FIG. 6 shows the connector-plug part according to FIG. 5 with the cladding parts fully closed but the sleeve shells still open, FIG. 7 shows the connector-plug part according to FIG. 6 during the closing of the sleeve shells, FIG. 8 shows the connector-plug part according to FIG. 7 with axially decoupled protective sleeve and FIG. 9 shows a perspective representation of a ready assembled connector-plug part shortly before insertion into a connector-plug housing.

As represented in FIG. 1, a connector-plug part, designated as a whole by 1, substantially comprises a pin holder, designated as a whole by 4, and a connector-plug pin 2 of a generally very hard material, such as ceramic or hard metal for example. The pin holder itself in turn comprises two shell parts 10, 10', which can be fitted together on a plane running through a longitudinal center axis 3. Finally, the pin holder 4 (in the closed state) is divided into a pin receiving section 5 and a cable receiving section 6.

The two shell parts 10, 10' consist for example of plastic material, preferably being injection-molded in the opened-out position for technical molding-related reasons. The two shell parts are completely identical. For the connection to each other, conical lugs 12 and corresponding lug openings 13 are provided on the mutually contacting surfaces 11. The hermaphroditic arrangement of these connecting means allows the sleeve-like pin holder 4 to be produced from shell parts of a single type.

In the case of the present exemplary embodiment, each shell part 10, 10' forms over the entire length of the cable receiving section 6 a cladding part 8, 8', which is connected to the pin receiving section 5 by a film hinge 9. The cladding parts can in this case be swung out unproblematically by about 90° with respect to the longitudinal center axis 3.

The connector-plug pin 2 is provided on its outer circumferential surface with two plane-parallel clearances 18. A pair of corresponding ribs 17 on the inside of the pin receiving section engage in these clearances, a certain resilient displacement in the direction of the longitudinal center axis 3 being allowed. A helical compression spring 19 provides the necessary axial prestressing. An optical waveguide stub 21 has already been fixedly connected to the connector-plug pin 2, and centered in it. This stub has a bare, stripped end 22.

The perspective representation of detail a shows the cladding part 8 in a position in which it has been turned somewhat further. It is evident from this that the cladding part is provided with a through-opening 44. This opening is adjoined on the inside by a slot 45, which extends in the axial direction. The cladding part 8' is formed as a mirror image. In the perspective representation of detail b, the cladding part 8 has been turned by 180°. From this perspective, the positioning means 36, which later serve for the radial positioning of the connector-plug part in a connector-plug housing, can also be seen.

Arranged on the inside of each of the two cladding parts 8, 8' is a sleeve shell 25, 25'. The representation of detail c shows the sleeve shell 25 turned by 180°. The two sleeve shells together produce a protective sleeve. At each of both ends, such a protective sleeve has a receiving section 39 and 39', half of which can respectively be seen in FIG. 1. Arranged on the inside of this receiving section are teeth 40, which dig into the coating of an optical waveguide during the closing of the two sleeve shells. Also arranged on the inside 38 of the sleeve shells are lugs 41 and lug openings 42, to be precise not on the outside but in the region of the center. A channel 37, which is coated for example with a silicone material, extends in the axial direction. This channel later receives the bare optical waveguide with the welded location. The silicone material could also be substituted by an adhesive layer, which however has been applied to the optical waveguide in advance.

For the temporary fixing to the two cladding parts 8, 8', respectively provided on the outside of the sleeve shells is an insertion head 43, which is dimensioned in such a way that it is fixed with a wringing fit in the corresponding opening 44.

FIGS. 2 and 3 show the connector-plug part as a pre-assembled unit 20, in which the connector-plug pin 2 is captively and axially resiliently enclosed in the pin receiving section 5. The sleeve shells 25 and 25' have been inserted into the respective cladding parts 8 and 8' and are likewise captively held there. As can be seen in particular from FIG. 3, the two sleeve shells are deformed somewhat by the insertion of the insertion heads 43 into the openings 44, so that they are convexly curved. The receiving sections 39, 39' are in this case supported on the inside of the cladding parts 8, 8'.

In this pre-assembled state, the bare end 22 of the optical waveguide stub 21 is then welded onto the end 23 of an optical waveguide cable 7 in a way known per se under conditions in the field (FIG. 4). As is evident, the welding operation is not in this case hindered in any way by the pivoted-open cladding parts.

In FIG. 4, the welded location 24 between the bare optical waveguide ends 22 and 23 is symbolically represented. After the welding operation, the two cladding parts 8, 8' are swung together, in that force is exerted from the outside in the direction of the arrow K1. This closing movement is continued according to FIG. 5 until the lugs 12 engage in the lug openings 13. As represented, in this state the welded optical waveguide cable is not yet influenced by forces.

The final closing of the two cladding parts 8, 8' takes place according to FIG. 6 by force acting in the direction of the arrow K2 on both ends of the cladding parts. The receiving sections 39, 39' thereby respectively grasp the coating of the optical waveguide cable 7 and of the optical waveguide stub 21 with non-positive engagement. However, the two sleeve shells 25, 25' are not yet connected to each other in the central region of the welded location 24, because the lugs 41 do not yet engage in the lug openings 42 as a result of the convex curvature.

Only now is force exerted on the center of the sleeve shells 25, 25', according to FIG. 7, from the outside in the direction of the arrow K3. As this happens, on the one hand the lugs 41 force themselves into the lug openings 42 and on the other hand the insertion heads 43 are released from the openings 44, so that the protective sleeve as a whole is decoupled in the axial direction.

As can be seen from FIG. 8, the protective sleeve 25, 25' can now be displaced back in the axial direction, the insertion heads 43 moving in the slot 45 and in this way ensuring a safeguard against twisting. The one-sided arrangement of the slot 45 proceeding from the opening 44 has the effect, however, that the displacement is only possible toward the cable side 7.

Also generally required for the handling of the optical plug-in connection is a connector-plug housing 14, as represented in FIG. 9. This provides the anchorage in the socket part and the protection of the end face of the connector-plug pin 2. In the case of the exemplary embodiment, the pin holder 4 has a conical section 15, which can be pressed into a conical receptacle 16 on the connector-plug part. The angular positioning takes place in this case at the positioning means 36. The optical waveguide cable is fixedly connected to the pin holder 4 by means of a crimping sleeve 34.

The invention claimed is:

1. A connector-plug part (1) for an optical plug-in connection, with
   a connector-plug pin (2), in which
   an optical waveguide stub (21) extending over a longitudinal center axis (3) is held, and with a sleeve-like pin holder (4) with
   a pin receiving section (5), in which the connector-plug pin is held, and with
   a cable receiving section (6), to which the end of an optical waveguide cable (7) can be fixed in a tension-resistant manner, it being possible for the optical waveguide stub to be welded to the optical waveguide end (23) on the cable side, characterized in that the cable receiving section (6) has at least two cladding parts (8, 8'), which can be pivoted at joints (9) by a certain pivoting angle between an open position and a closed position, the end (22) of the optical waveguide stub (21) that is to be welded lying in the pivoting region of the pivotable cladding part in order to expose the waveguide end that is to be welded, and in that a protective sleeve, comprising two protective sleeve shells (25, 25'), the protective sleeve shells being closable around the welded location, is arranged within the cable receiving section (6).

2. The connector-plug part as claimed in claim 1, characterized in that the pin holder (4) comprises two shell parts (10, 10'), which can be fitted together along the longitudinal center axis (3), each shell part having the respective pivotable cladding part (8, 8'), and each of said protective sleeve shells being fastenable on the inside of said respective pivotable cladding part.

3. The connector-plug part as claimed in claim 2, characterized in that the two cladding parts (8, 8') altogether form the cable receiving section (6) and are connected to the pin receiving section (5) at the joint (9).

4. The connector-plug part as claimed in claim 2, characterized in that the pin holder (4) comprises two identical shell parts (10, 10'), which can be fitted together on a plane running through the longitudinal center axis (3).

5. The connector-plug part as claimed in claim 1, characterized in that at least the cable receiving section (6) comprises two preferably identical shell parts, which can be fitted together along the longitudinal center axis (3), each shell part forming the pivotable cladding part (8, 8'), which is connected to the pin receiving section (5) at the joint (9), and the protective sleeve likewise comprising two sleeve shells (25, 25'), each of which can be fastened on the inside of the cladding part.

6. The connector-plug part as claimed in claim 2, characterized in that neighboring shell parts (10, 10') have on their contacting surfaces (11) projections and clearances which engage in one another, in particular lugs (12) and lug openings (13).

7. The connector-plug part as claimed in claim 2, characterized in that the protective sleeve is mounted displaceably in the axial direction in the cable receiving section (6) in relation to the latter.

8. The connector-plug part as claimed in claim 2, characterized in that the two sleeve shells (25, 25') of the protective sleeve have on their inside (38), facing the optical waveguide, a channel (37) which receives the optical waveguide and is provided with an adhesive material.

9. The connector-plug part as claimed in claim 2, characterized in that the two sleeve shells (25, 25') of the protective sleeve have on their inside (38), facing the optical waveguide, a receiving section (39, 39') at each of their two ends, which respectively clasps the circumferential surface of an optical waveguide cable and of the optical waveguide stub in a clamping manner.

10. The connector-plug part as claimed in claim 2, characterized in that the two sleeve shells (25, 25') of the protective sleeve are elastically deformable and in that they can be fixed on the inside of the cladding parts (8, 8') in such a way that their insides (38), facing the optical waveguide, run in a concavely curved manner and that the sleeve shells can be fitted together in the closed position of the cladding parts by pressure from the outside.

11. The connector-plug part as claimed in claim 10, characterized in that the sleeve shells (25, 25') have on their contacting surfaces (38) interengaging projections and clearances, in particular lugs (41) and lug openings (42), which are arranged in such a way that they still do not engage in one another in the concavely curved state of the sleeve shells.

12. The connector-plug part as claimed in claim 10, characterized in that each sleeve shell (25, 25') is fastened by an insertion head (43) in a corresponding opening (44) in the cladding part, the insertion heads being releasable from the openings after the pressing together of the sleeve shells for axial release of the protective sleeve.

13. The connector-plug part as claimed in claim 12, characterized in that a slot (45) which adjoins the opening (44) and extends in the axial direction is arranged on the inside of the cladding parts (8, 8') and in that the insertion heads (43) are displaceable in the slot after the axial release of the protective sleeve as a safeguard against twisting.

14. The connector-plug part as claimed in claim 1, characterized in that the pin holder and the protective sleeve consist of plastic material and in that the joint is a film hinge.

15. The connector-plug part as claimed in claim 1, characterized in that the connector-plug pin (2) is mounted with limited displaceability in the pin receiving section (5) under axial spring prestressing.

\* \* \* \* \*